United States Patent
Lai et al.

(10) Patent No.: US 9,904,413 B2
(45) Date of Patent: Feb. 27, 2018

(54) OPTICAL TOUCH DEVICE, AND LIGHT SOURCE ASSEMBLY AND DISPLAY MODULE THEREOF

(71) Applicant: PixArt Imaging Inc., Hsinchu (TW)

(72) Inventors: Hung-Ching Lai, Hsinchu (TW); Hui-Hsuan Chen, Hsinchu (TW); Ming-Tsan Kao, Hsinchu (TW)

(73) Assignee: PIXART IMAGING INC., Hsinchu (TW)

(*) Notice: Subject to any disclaimer, the term of this patent is extended or adjusted under 35 U.S.C. 154(b) by 403 days.

(21) Appl. No.: 13/708,918

(22) Filed: Dec. 7, 2012

(65) Prior Publication Data

US 2013/0147765 A1   Jun. 13, 2013

(30) Foreign Application Priority Data

Dec. 8, 2011   (TW) .............................. 100145312 A

(51) Int. Cl.
*G06F 3/042*   (2006.01)

(52) U.S. Cl.
CPC ............ *G06F 3/042* (2013.01); *G06F 3/0421* (2013.01)

(58) Field of Classification Search
CPC ................................ G06F 3/042; G06F 3/0421
See application file for complete search history.

(56) References Cited

U.S. PATENT DOCUMENTS

| | | | | |
|---|---|---|---|---|
| 2002/0175900 A1* | 11/2002 | Armstrong | ........... | H01H 13/702 345/169 |
| 2004/0140960 A1 | 7/2004 | Cok | | |
| 2004/0140961 A1* | 7/2004 | Cok | ...................... | H01L 27/323 345/175 |
| 2005/0093466 A1* | 5/2005 | Matsumoto | ........... | G06F 3/0421 315/169.3 |
| 2005/0243070 A1* | 11/2005 | Ung | ..................... | G06F 3/03545 345/176 |
| 2006/0114244 A1* | 6/2006 | Saxena et al. | ................. | 345/175 |
| 2009/0295760 A1* | 12/2009 | Linge et al. | .................... | 345/179 |
| 2010/0090969 A1* | 4/2010 | Zhao | ..................... | G06F 3/0421 345/173 |
| 2010/0220245 A1* | 9/2010 | Yang | ....................... | G06F 3/042 348/739 |
| 2010/0245264 A1* | 9/2010 | Wu | ....................... | G06F 3/0423 345/173 |
| 2011/0122095 A1 | 5/2011 | Tsai et al. | | |

(Continued)

FOREIGN PATENT DOCUMENTS

CN    1536527 A    10/2004
CN    102012768 A    4/2011
(Continued)

*Primary Examiner* — Mihir K Rayan
(74) *Attorney, Agent, or Firm* — Cheng-Ju Chiang

(57) ABSTRACT

An optical touch device includes a sensing area, at least a light source assembly and a light sensing component. The light source assembly is disposed beside the sensing area and includes a plurality of first point light sources configured to sequentially emit a first beam into the sensing area. The light sensing component has a field of view of the entire sensing area and is configured to sense the first beams. A light source assembly and a display module used in the optical touch device are also disclosed.

15 Claims, 7 Drawing Sheets

(56) References Cited

U.S. PATENT DOCUMENTS

| | | | | |
|---|---|---|---|---|
| 2011/0148818 A1* | 6/2011 | Jhu | ................. | G06F 3/0428 |
| | | | | 345/175 |
| 2011/0241984 A1* | 10/2011 | Morrison | .............. | G06F 3/0421 |
| | | | | 345/157 |
| 2012/0098794 A1* | 4/2012 | Kleinert | ............. | G02B 27/0983 |
| | | | | 345/175 |
| 2013/0082980 A1* | 4/2013 | Gruhlke | .............. | G02F 1/13338 |
| | | | | 345/175 |
| 2015/0103051 A1* | 4/2015 | Wyrwas | ................ | G06F 3/0416 |
| | | | | 345/175 |

FOREIGN PATENT DOCUMENTS

| | | |
|---|---|---|
| TW | 201003477 A1 | 1/2010 |
| TW | 201025100 A | 7/2010 |
| TW | 201118467 A1 | 6/2011 |

* cited by examiner

OPTICAL TOUCH DEVICE, AND LIGHT SOURCE ASSEMBLY AND DISPLAY MODULE THEREOF

TECHNICAL FIELD

The present invention relates to a touch device, and more particularly to an optical touch device, and a light source assembly and a display module thereof.

BACKGROUND

In recent years, touch device, due to having advantages of easy operation, has been widely used in many various electronic products such as a mobile phone, tablet computer, digital camera, music player, satellite navigation device and touch screen. Touch devices basically can be categorized into resistive touch devices, capacitive touch devices and optical touch devices, etc.; among which optical touch devices, due to having a better durability and a lower cost, have been getting more and more attentions.

FIG. 1 is a schematic top view of a conventional optical touch device. As shown, the optical touch device 100 includes a plurality of point light sources 110 disposed in the X-axis direction, a plurality of point light sources 120 disposed in the Y-axis direction, a plurality of light sensing components 130 disposed in the X-axis direction and corresponding to the point light sources 110 in a one-to-one manner and a plurality of light sensing components 140 disposed in the Y-axis direction and corresponding to the point light sources 120 in a one-to-one manner. A sensing area 102 is defined by the point light sources 110, 120 and the light sensing components 130, 140. The light sensing components 130 each are configured to sense beam 112 emitted from its corresponding point light source 110; and the light sensing components 140 each are configured to sense beam 122 emitted from its corresponding point light source 120.

When a user uses his/or her finger 50 to touch the sensing area 102 so as to perform a touch operation, some beams 112, 122 respectively emitted from the corresponding point light sources 110, 120 (for example, the point light sources 110a, 120a) are blocked by the finger 50 and accordingly some corresponding light sensing components 130, 140 (for example, the light sensing components 130a, 140a) may sense relatively weak optical signals; and thus, the optical touch device 100 can determine the position of the finger 50 according to these relatively weak optical signals. However, because requiring a relatively large number of light sensing components 130, 140, the conventional optical touch device 100 has a higher cost.

SUMMARY OF EMBODIMENTS

Therefore, one object of the present invention is to provide an optical touch device having a lower cost.

Another object of the present invention is to provide a light source assembly so as to decrease the associated optical touch device's cost.

Still another object of the present invention is to provide a display module so as to decrease the associated optical touch device's cost.

The present invention provides an optical touch device, which includes a sensing area, at least a light source assembly and a light sensing component. The light source assembly is disposed beside the sensing area and includes a plurality of first point light sources configured to sequentially emit a first beam into the sensing area. The light sensing component has a field of view of the entire sensing area and is configured to sense the first beams.

In an embodiment of the present invention, the sensing area is configured to have a rectangular structure with a first side, a second side, a third side and a fourth side. The first and third sides are configured to be opposite to each other. The second and fourth sides are configured to be opposite to each other. The light source assembly is disposed beside the first side. The light sensing component is disposed in a boundary area between the third and fourth sides.

In an embodiment of the present invention, the optical touch device includes two light source assemblies. The sensing area is configured to have a rectangular structure with a first side, a second side, a third side and a fourth side. The first and third sides are configured to be opposite to each other. The second and fourth sides are configured to be opposite to each other. The light source assembly is disposed beside the first and second sides. The light sensing component is disposed in a boundary area between the third and fourth sides.

In an embodiment of the present invention, the aforementioned optical touch device further includes a display panel and a light guide plate. The display panel has a display surface and a back surface. The sensing area is defined on the display surface. The light guide plate has a light emission surface and a plurality of side surfaces. The light emission surface is opposite to the back surface. The side surfaces are connected to the light emission surface. The light source assembly is configured to be opposite to one of the side surfaces.

In an embodiment of the present invention, the light source assembly further includes a plurality of second point light sources. Each second point light source is configured to provide a second beam. The first beam is an invisible light. The second beam is a visible light.

In an embodiment of the present invention, the first point light sources include infrared light emitting diodes. The second point light sources include white light emitting diodes.

In an embodiment of the present invention, the first point light sources and the second point light sources are arranged alternatively in a same row.

In an embodiment of the present invention, the first point light sources are arranged in a first row, the second point light sources are arranged in a second row.

In an embodiment of the present invention, the first and second rows are configured to be parallel to each other.

In an embodiment of the present invention, the aforementioned optical touch device further includes at least a white light source. The white light source and the light source assembly are disposed to be opposite to two different side surfaces of the light guide plate, respectively.

In an embodiment of the present invention, the first point light sources are arranged in a spaced manner.

In an embodiment of the present invention, the aforementioned optical touch device further includes a substrate. The sensing area is defined above the substrate.

In an embodiment of the present invention, the aforementioned optical touch device further includes a light source control unit electrically connected to the first point light sources and configured to control the first point light sources to emit the first beams sequentially.

In an embodiment of the present invention, the first beam is an invisible light.

In an embodiment of the present invention, the aforementioned light source assembly further includes a carrier board; the first point light sources are disposed on the carrier board.

The present invention further provides a light source assembly of an optical touch device, which includes a plurality of first point light sources and a light source control unit. The first point light sources are disposed on a substrate of the optical touch device. The light source control unit is electrically connected to the first point light sources and configured to control the first point light sources to be switched-on or switched-off sequentially according to a predetermined time sequence.

In an embodiment of the present invention, the aforementioned light source assembly of an optical touch device further includes a plurality of second point light sources disposed on the substrate and electrically connected to the light source control unit. The first point light sources are invisible light sources. The second point light sources are visible light sources. The light source control unit is further configured to control the second point light sources to be switched-on or switched-off.

In an embodiment of the present invention, the first point light sources are invisible light sources.

In an embodiment of the present invention, the aforementioned light source assembly of an optical touch device further includes a carrier board disposed on the substrate. The first point light sources are fixed on the carrier board.

The present invention still provides a display module of an optical touch device, which includes a substrate, a light guide flat plate and a light source assembly. The light guide flat plate is disposed on the substrate. A sensing area is formed above the light guide flat plate. The light source assembly is disposed beside at least a side of the light guide flat plate and includes a plurality of first point light sources and a light source control unit. The light source control unit is electrically connected to the first point light sources and configured to control the first point light sources to be switched-on or switched-off sequentially according to a predetermined time sequence.

In an embodiment of the present invention, the aforementioned display module of an optical touch device further includes a display panel disposed on the light guide flat plate.

In an embodiment of the present invention, the aforementioned light source assembly further includes a plurality of second point light sources disposed on the substrate and electrically connected to the light source control unit. The first point light sources are invisible light sources. The second point light sources are visible light sources. The light source control unit is further configured to control the second point light sources to be switched-on or switched-off.

In an embodiment of the present invention, the first point light sources are invisible light sources.

In an embodiment of the present invention, the light source assembly further includes a carrier board disposed on the substrate. The first point light sources are fixed on the carrier board.

In summary, in the optical touch device, the light source assembly and the display module according to the present invention, because the point light sources are configured to emit beams sequentially, an object's position in the sensing area can be identified by one light sensing component. Thus, the number of the light sensing components in the present invention can decrease and consequently the optical touch device according to the present invention can have a lower cost.

BRIEF DESCRIPTION OF THE DRAWINGS

The above embodiments will become more readily apparent to those ordinarily skilled in the art after reviewing the following detailed description and accompanying drawings, in which.

DETAILED DESCRIPTION OF PREFERRED EMBODIMENTS

The disclosure will now be described more specifically with reference to the following embodiments. It is to be noted that the following descriptions of preferred embodiments are presented herein for purpose of illustration and description only. It is not intended to be exhaustive or to be limited to the precise form disclosed.

Figure 1:
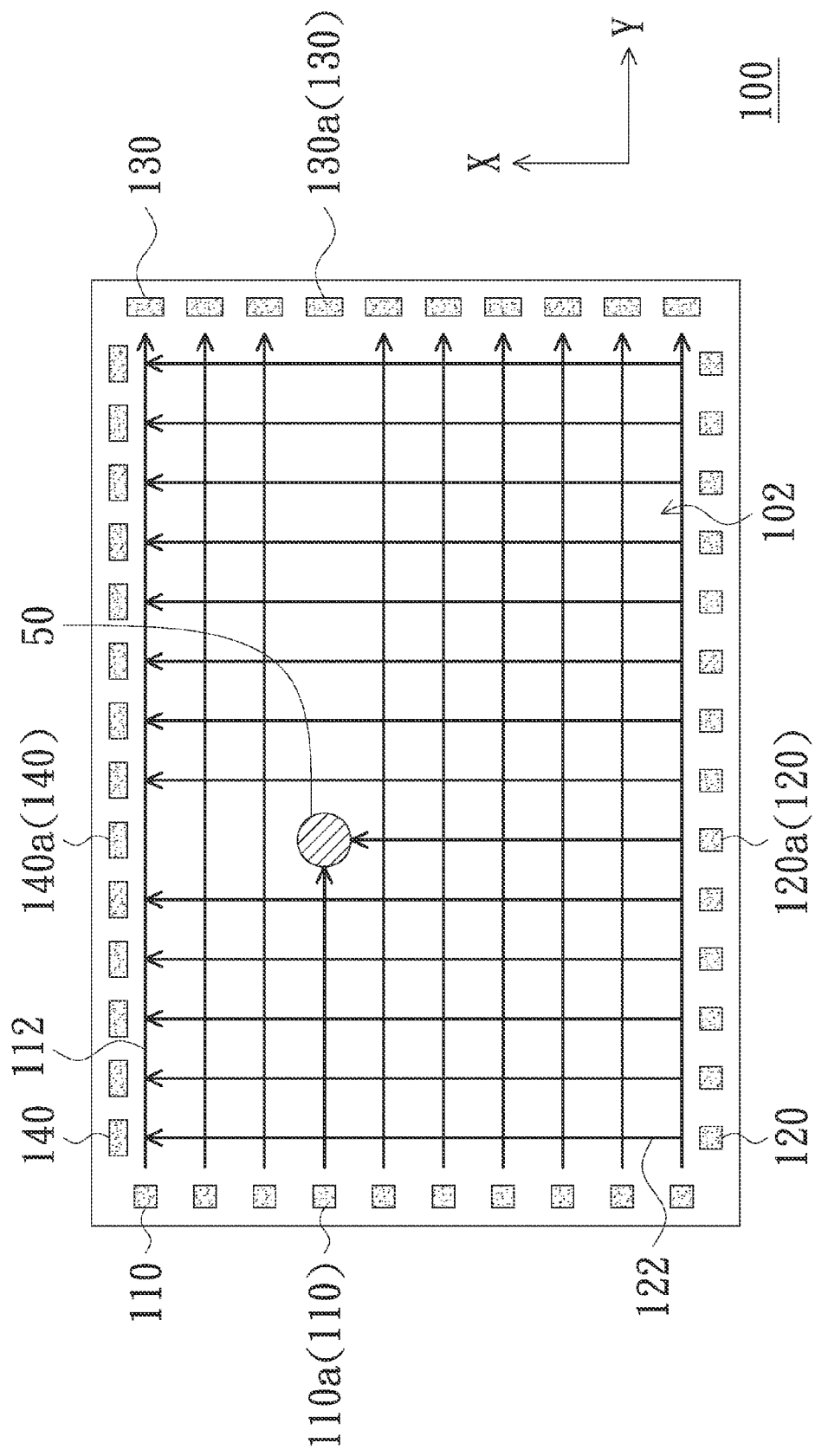
FIG. 1 is a schematic top view of a conventional optical touch device.
Figure 2:
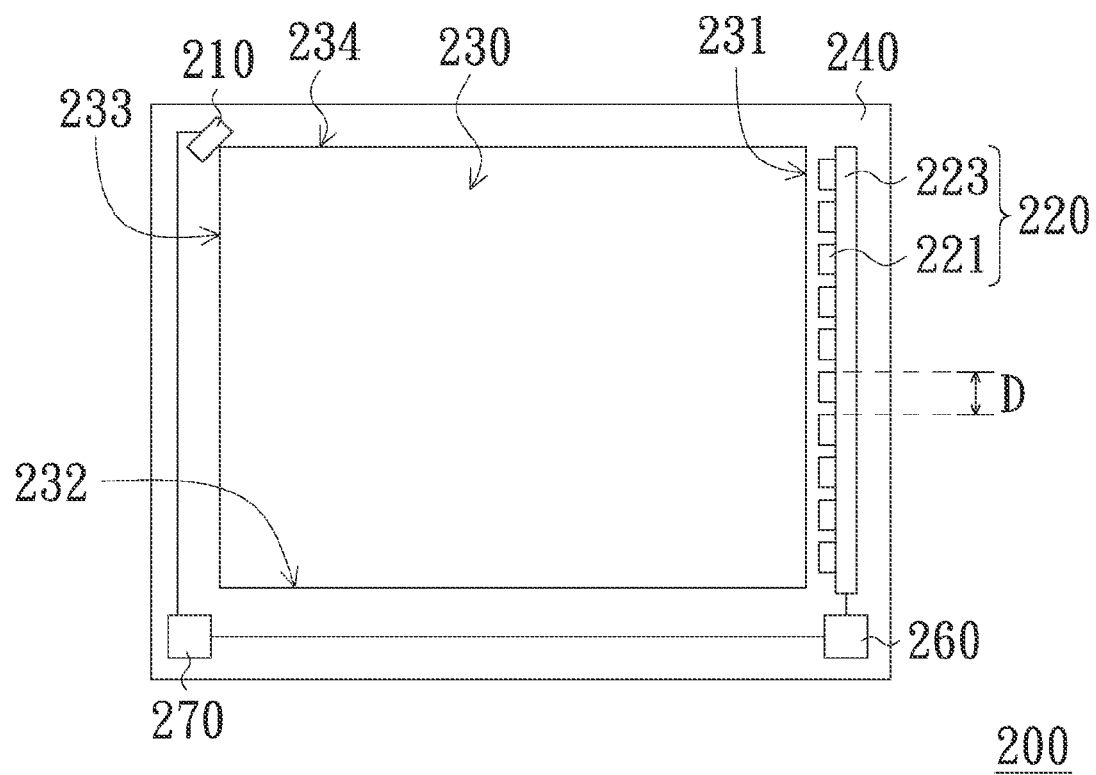
FIG. 2 is a schematic top view of an optical touch device in accordance with one embodiment of the present invention.

FIG. 2 is a schematic top view of an optical touch device in accordance with one embodiment of the present invention. As shown, the optical touch device 200 includes a sensing area 230, a light source assembly 220 and a light sensing component 210. The light source assembly 220 is disposed beside the sensing area 230. The light sensing component 210 is configured to have a field of view (FOV) of the entire sensing area 230. The light source assembly 220 includes a plurality of point light sources 221, which are configured to sequentially emit first beams (not shown) into the sensing area 230 according to a predetermined time sequence; wherein these first beams can be sensed by the light sensing component 210. In this embodiment, the first beam is, for example, an invisible light (for example, an infrared light), and accordingly the point light sources 221 each are an infrared light emitting diode.

The light sensing component 210 is, for example, disposed above the sensing area 230 and configured to sense the first beams (also referred as optical signals) emitted from the point light sources 221 of the light source assembly 220. The light source assembly 220 is disposed above the sensing area 230. In another embodiment, the sensing area 230 is disposed above a light guide plate (not shown) and the light source assembly 220 is disposed beside the light guide plate;

wherein the first beams emitted from the light source assembly 220 are directed into the sensing area 230 through the light guide plate.

In this embodiment, the sensing area 230 is configured to have, for example, a rectangular structure constituted by a first side 231, a second side 232, a third side 233 and a fourth side 234. The first side 231 and the third side 233 are configured to be opposite to each other; the second side 232 and the fourth side 234 are configured to be opposite to each other; and specifically the light source assembly 220 is disposed beside the first side 231 of the sensing area 230. Additionally, in order to sense the first beams, the light sensing component 210 is disposed at a corner opposite to the first side 231. For example, the light sensing component 210 is disposed in a boundary area between the third side 233 and the fourth side 234.

Besides the point light sources 221, the light source assembly 220 further includes a carrier board 223 and on which, with no limitation, the point light sources 221 are disposed. In this embodiment, these point light sources 221 are arranged in a spaced manner, and an interval D between each two adjacent point light sources 221 is designed, due to a user usually uses his/or her finger as a media to perform a touch operation, to be a little smaller than a finger width. Specifically, because generally a finger width is about 12 mm, the interval D is designed to be smaller than 12 mm (for example, 10 mm); and thus, the optical touch device 200 can have a higher sensing accuracy.

The optical touch device 200 further includes a light source control unit 260. The light source control unit 260 is electrically connected to the point light sources 221 (specifically, electrically connected to each point light source 221) and configured to control the switch-on and switch-off of the point light sources 221 and thereby controlling the point light sources 221 to sequentially emit the first beams into the sensing area 230, according to a predetermined time sequence. In this embodiment, the light source control unit 260 is electrically connected to the point light sources 221 through the carrier board 223; however, it is understood that the light source control unit 260 can be electrically connected to the point light sources 221 respectively through a plurality of signal wires in an embodiment without the carrier board 223. In addition, the duration-time for each point light source 221 to emit first beam is, with no limitation, about 0.1 ms~1 ms. In addition, the optical touch device 200 further includes a substrate 240, above which the sensing area 230 are defined and on which the light sensing component 210, the light source assembly 220 and the light source control unit 260 are disposed.

In this embodiment, because these point light sources 221 are configured to emit beams sequentially, accordingly when one point light source 221 emits beams simultaneously the rest are configured not to emit beams. Thus, by adopting one light sensing component 210 only, the optical touch device 200 can determine the position of an object (for example, a user's finger) in the sensing area 230. The process of the optical touch device 200 sensing as well as determining an object's position in the sensing area 230 will be illustrated in the following with a cooperation of related figures.

Figure 3A:
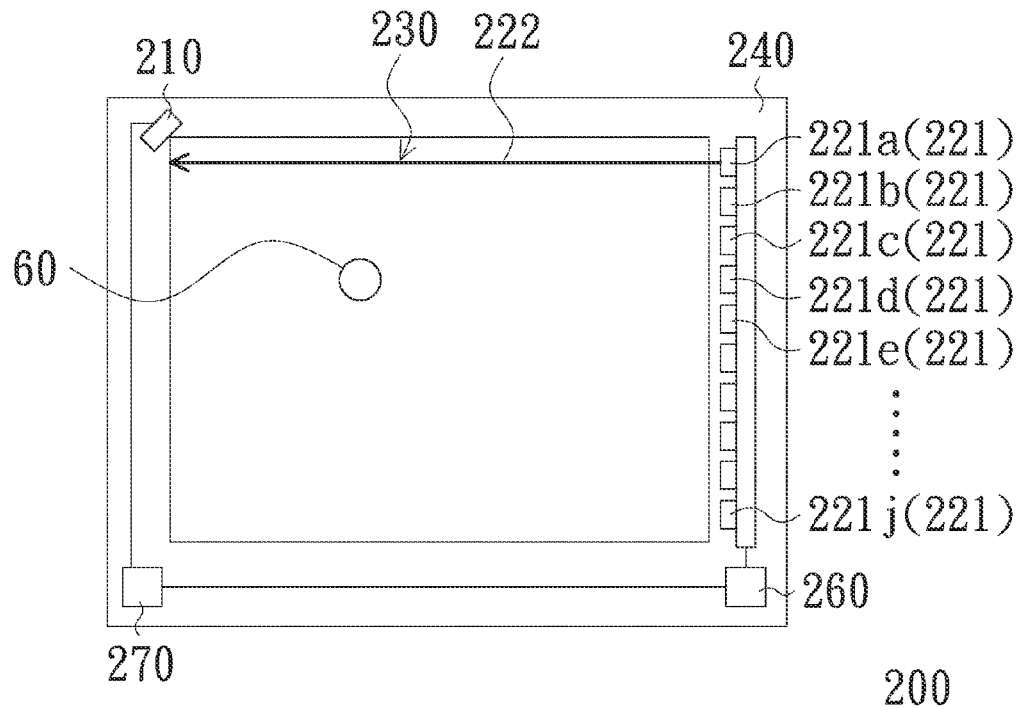
FIGS. 3A, 3B are schematic views for illustrating the process of the optical touch device sensing and determining an object's position in the sensing area.
Figure 3B:
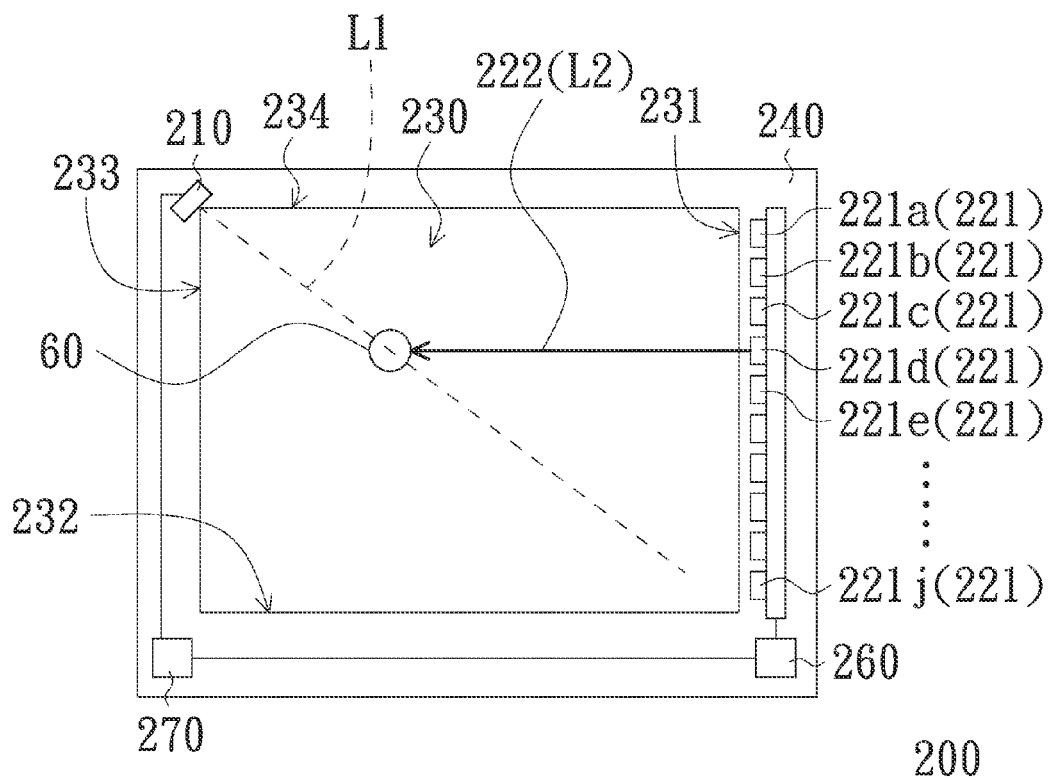

FIGS. 3A, 3B are schematic views for illustrating the process of the optical touch device 200 sensing and determining an object's position in the sensing area 230. As shown in FIG. 3A, firstly the light source control unit 260 controls the point light sources 221a~221j to sequentially emit beams to scan the sensing area 230 so as to determine whether or not an object 60 (for example, a user's finger) existing in the sensing area 230; wherein the position of the object 60 can be determined according to the scan result if the object 60 is detected. For example, first, the light source control unit 260 controls the point light source 221a to emit the first beam 222; and at least a portion of the first beam 222 accordingly will be expanded in different directions if the first beam 222 is blocked by the object 60. Thus, according to the image of the expansion of the first light beam 222 captured by the light sensing component 210, the position information of the object 60 is obtained. It is understood that the light source control unit 260 controls the point light sources 221b~221j to emit first beams 222 sequentially based on the same manner.

Please refer to FIG. 3B. As shown, the light source control unit 260 controls the point light source 221d to emit the first beam 222, the first beam 222 emitted from the point light source 221d will be blocked by the object 60 and simultaneously the light sensing component 210 can sense a partially-bright first beam 222 and also determine the position of the blocking point of the first beam 222; wherein through the position of the blocking point of the first beam 222, the object 60 is determined to be located at a line L1. Moreover, because the optical path L2, for the point light source 221d to emit the first beam 222, is known information, the position information of the object 60 (or, the intersection point of the line L1 and the optical path L2) can be obtained. Thus, the optical touch device 200 can determine the position of the object 60 by adopting one light sensing component 210 only and consequently can have a lower cost.

It is to be noted that, the first beams 222 emitted from the point light sources 221c, 221e, which are adjacent to the point light source 221d, may be also blocked partially by the object 60 and consequently result in inaccurate position information of the object 60. Thus, in this embodiment the obtained position information can be further processed by a centroid method or a centric method. For example, the captured brightness information can be referred as weight data and introduced in the calculation of the weighted-average centre position for the obtainment of the more-accurate position of the object 60. The centroid or the centric methods are apparent to those ordinarily skilled in the art; no any unnecessary detail will be given here. In addition, the optical touch device 200 may further include a processing unit 270. The processing unit 270 is electrically connected to the light sensing component 210 and the light source control unit 260 and configured to calculate the position of the object 60 according to the position information obtained from the light sensing component 210 and the emitting information of the point light sources 221 (for example, the point light source 221d). It is understood that the processing unit 270 can be integrated into either the light source control unit 260 or the light sensing component 210 in another embodiment, and accordingly the light source control unit 260 and the light sensing component 210 are configured to be electrically connected to each other.

In addition, the aforementioned embodiment is exemplified by configuring one point light source 221 to emit beams in one time-interval; however, for saving the scanning time, it is understood that two or more than two point light sources 221 can be configured to simultaneously emit beams in a same time-interval. In another embodiment, the emission times of two adjacent point light sources 221 may overlap. For example, if the point light sources 221a, 221b and 221c are configured to sequentially emit beams and each is configured to have an emission time of 1 ms, the point light sources 221a, 221b may have an overlapped emission time of 0.5 ms therebetween and the point light sources 221b, 221c may have an overlapped emission time of 0.5 ms therebetween.

Figure 4:
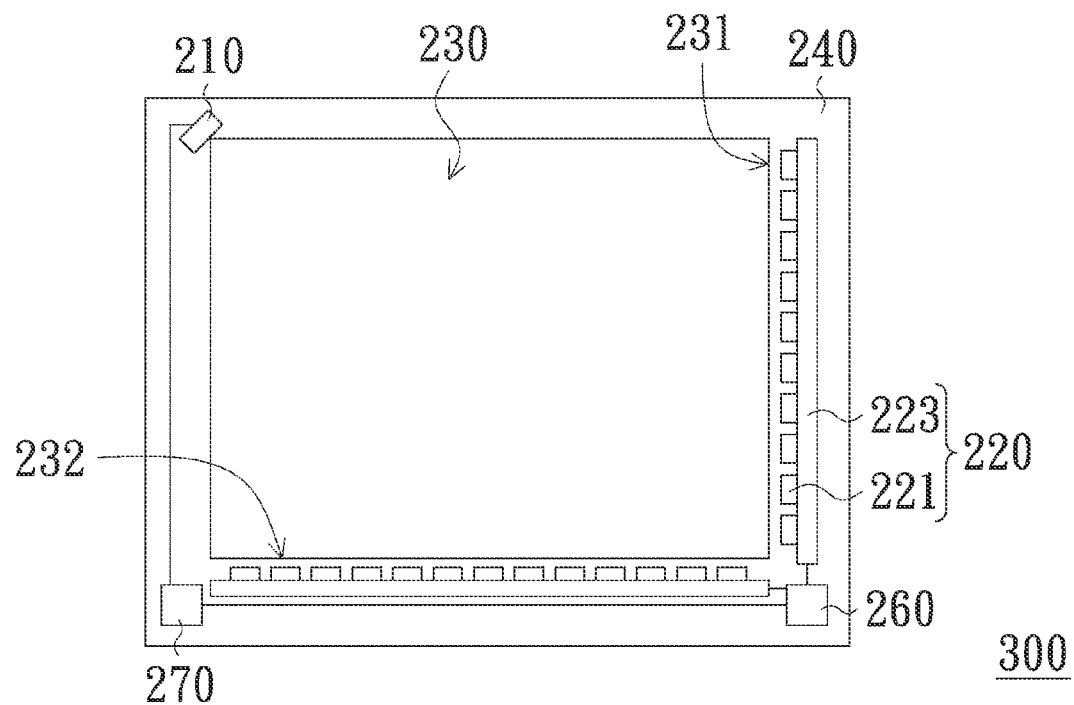
FIG. 4 is a schematic top view of an optical touch device in accordance with another embodiment of the present invention.

It is understood that the aforementioned emission time and beam emitting sequence can be adjusted according to a specific structure, requirements or limitations of the optical touch device 200. FIG. 4 is a schematic top view of an optical touch device in accordance with another embodiment of the present invention. As shown, the optical touch device 300 has a structure similar to that of the optical touch device 200; the main difference between the two is that the optical touch device 300 includes two light source assemblies 220, which are respectively disposed beside the first side 231 and the second side 232 of the sensing area 230. The light source control unit 260 is electrically connected to the two light source assemblies 220 both so as to control the point light sources 221 in the two light source assemblies 220 to emit beams sequentially. According to this structure, the light sensing component 210 can obtain more position information and consequentially the optical touch device 300 can have a higher sensing accuracy.

Figure 5:
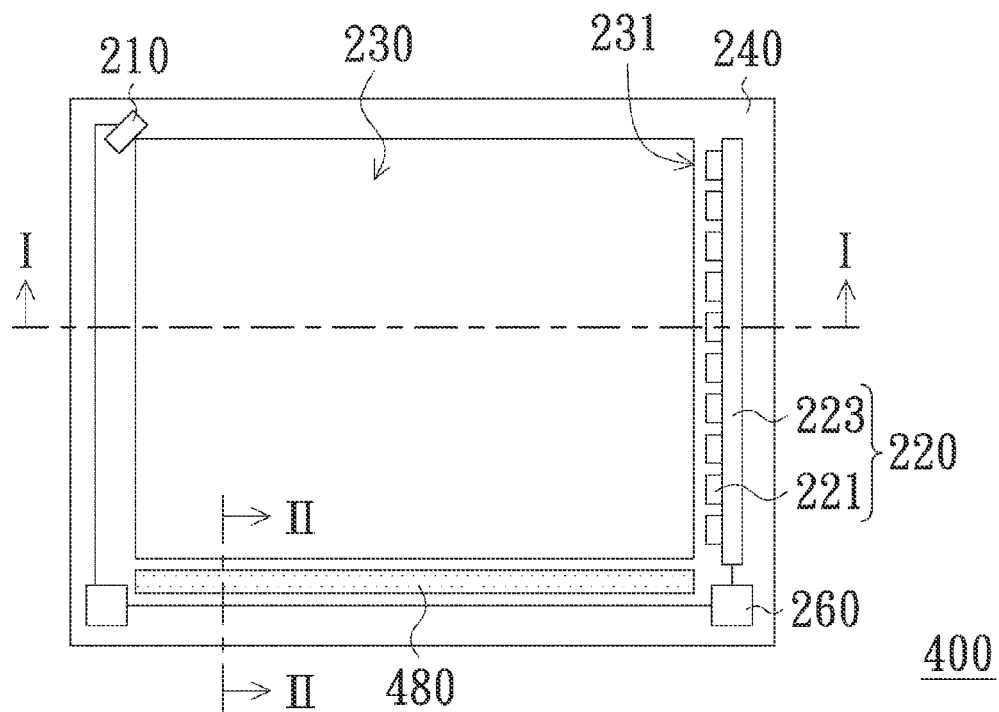
FIG. 5 is a schematic top view of an optical touch device in accordance with another embodiment of the present invention.
Figure 6A:
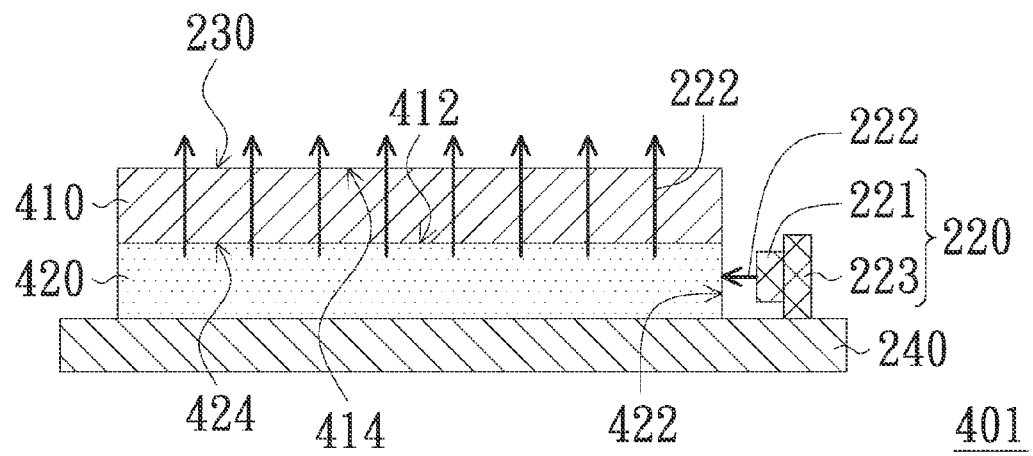
FIG. 6A is a schematic cross-sectional view of the optical touch device along a line I-I in FIG. 5.

FIG. 5 is a schematic top view of an optical touch device in accordance with another embodiment of the present invention. FIG. 6A is a schematic cross-sectional view of the optical touch device along a line I-I in FIG. 5. Please refer to FIGS. 5, 6A both. The optical touch device 400 is a touch screen and includes a display module 401. The display module 401 includes a substrate 240, a light guide plate 420 and a light source assembly 220. The light guide plate 420 is, for example, a light guide flat plate and disposed on the substrate 240. The sensing area 230 is, for example, formed above the light guide plate 420. In addition, the display module 401 further includes a display panel 410 disposed on the light guide plate 420; wherein the back surface 412 of the display panel 410 is opposite to the light emission surface 424 of the light guide plate 420. The display panel 410 is a penetrating display panel (for example, a liquid crystal display (LCD)). The light source assembly 220 is opposite to a side surface 422, the one connected to the light emission surface 424 of the light guide plate 420, of the light guide plate 420. The first beam 222 provided by the point light source 221 is configured to firstly emit into the light guide plate 420 through the side surface 422 thereof, then emit out from the light guide plate 420 through the light emission surface 424 thereof, and then emit through the display panel 410. The light sensing component 210 is configured to sense the first beam 222 emitting through the display panel 410. Specifically, at least a portion of the first beam 222 accordingly will be expanded in different directions if the first beam 222 is blocked by an object (not shown). Thus, according to the image of the expansion of the first light beam 222 captured by the light sensing component 210, the position information of the object is obtained. In addition, the light guide plate 420 and the display panel 410 may be configured to have an optical film (for example, a prism sheet or a diffuser, and not shown) disposed therebetween; and the light guide plate 420 and the substrate 240 are configured to have a reflector (not shown) disposed therebetween. In this embodiment, the sensing area 230 is, for example, located on a display surface 414 of the display panel 410; and the light sensing component 210 can sense the position information of an object (not shown) when the object is performing a touch operation on the sensing area 230. The means for the obtainment of position information in this embodiment is similar to that in the aforementioned embodiments, no any unnecessary will be given here.

Figure 6B:
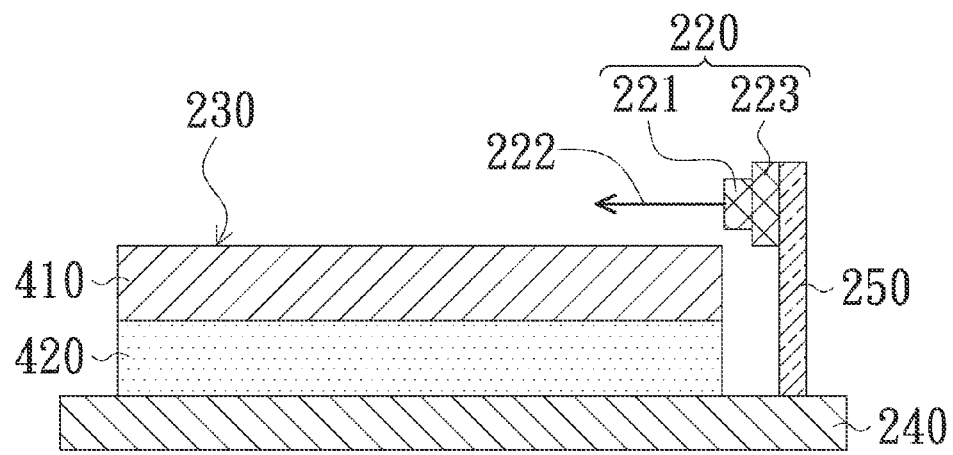
FIG. 6B is an alternative schematic cross-sectional view of the optical touch device along a line I-I in FIG. 5.

FIG. 6B is an alternative schematic cross-sectional view of the optical touch device along a line I-I in FIG. 5. As shown, the light source assembly 220 is disposed above the sensing area 230 and configured to directly provide the first beam 222 into the sensing area 230 without through a light guide plate. A supporting component 250 is disposed on the substrate 240 and the light source assembly 220 is disposed fixedly to the supporting component 250; and thereby the light source assembly 220 is lifted above the sensing area 230 by the supporting component 250.

Figure 7:
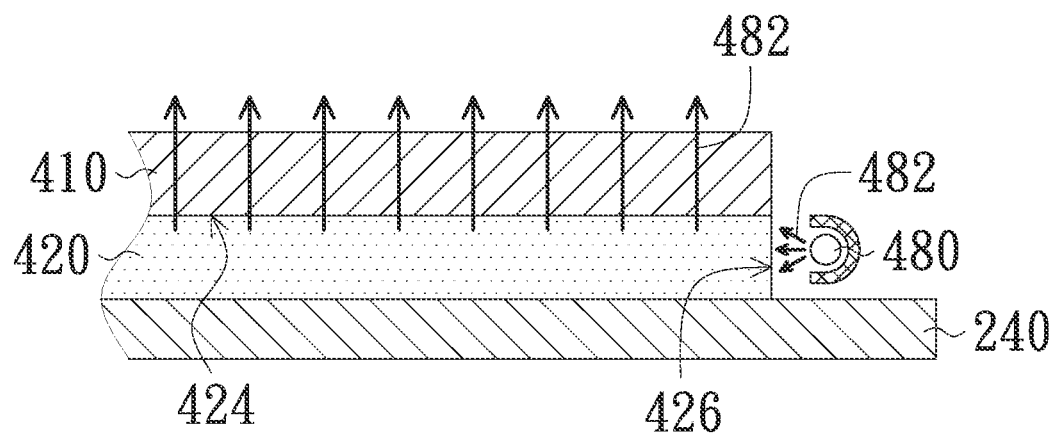
FIG. 7 is a schematic cross-sectional view of the optical touch device along a line II-II in FIG. 5.

FIG. 7 is a schematic cross-sectional view of the optical touch device along a line II-II in FIG. 5. Please refer to FIGS. 5, 7 both. The optical touch device 400 further includes a white light source 480, which is disposed to be opposite to a side surface 426, another one connected to the light emission surface 424, of the light guide plate 420. The white light source 480 is configured to emit white lights 482 functioned as display lights for the display panel 410; wherein the white lights 482 emitted from the white light source 480 are configured to firstly emit into the light guide plate 420 through the side surface 426 thereof and then emit out from the light guide plate 420 through the light emission surface 424 thereof.

In this embodiment, the white light source 480 is a lamp; however, the white light source 480 can be constituted by a plurality of white point light sources (for example, white light emitting diodes) in another embodiment. Additionally, although in this embodiment the optical touch device 400 is exemplified by one white light source 480 and one light source assembly 220; however, it is understood that the optical touch device 400 may include more than one white light source 480 and more than one light source assembly 220 in other embodiments. For example, the optical touch device 400 in another embodiment can include two white light sources 480 and two light source assemblies 220, which are respectively disposed to be opposite to two different sides of the light guide plate 420.

Figure 8:
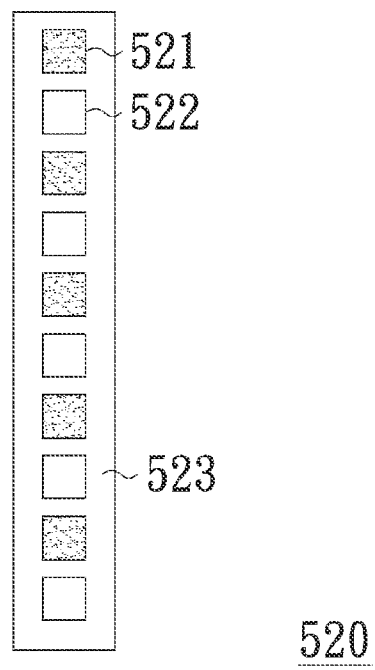
FIG. 8 is a schematic view of a light source assembly in an optical touch device in accordance with an embodiment of the present invention.

It is to be noted that the display panel 410 in the optical touch device 400 can be omitted in another embodiment if the optical touch device 400 is not required to provide display features. Moreover, in another embodiment, the white light source 480 can be integrated into the light source assembly 220. For example, as illustrated in FIG. 8, the light source assembly 520 includes point light sources 521, 522, which are alternatively arranged in a same row on a carrier board 523. Specifically, the point light sources 521 are configured to emit first beams for the light sensing component. Therefore, the first beam is an invisible light and accordingly the point light sources 521 are, for example, infrared light emitting diodes and configured to provide infrared lights. The point light sources 522 are configured to emit second beams functioned as display lights for the display panel. Therefore, the second beam is a visible light, and accordingly the point light sources 522 are, for example, white light emitting diodes and configured to provide white lights. It is to be noted that in FIG. 5, the white light sources 480 can be omitted if the light source assembly 220 is replaced by the light source assembly 520 as shown in FIG. 8.

Figure 9:
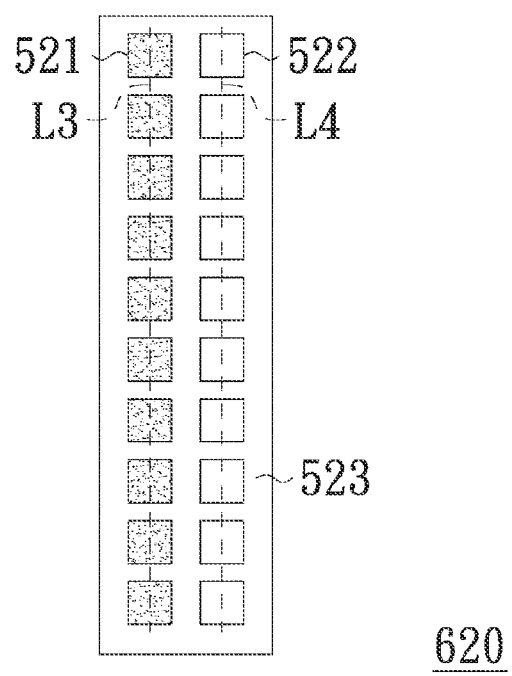
FIG. 9 is a schematic view of a light source assembly in an optical touch device in accordance with another embodiment of the present invention.

In another embodiment as illustrated in FIG. 9, the point light sources 521, 522 are arranged in two rows, respectively. In particular, the point light sources 521 are arranged in the first row L3 and the point light sources 522 are arranged in the second row L4. In particular, the first row L3 and the second row L4 are configured to be parallel to each other.

To sum up, in the optical touch device, the light source assembly and the display module according to the present invention, because the point light sources are configured to emit beams sequentially, an object's position in the sensing area can be identified by one light sensing component. Thus, the number of the light sensing components in the present invention can decrease and consequently the optical touch device according to the present invention can have a lower cost.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An optical touch device, comprising:
   a sensing area;
   at least a light source assembly disposed beside the sensing area and comprising a plurality of first point light sources for emitting a plurality of first beams;
   a light sensing component having a field of view of the entire sensing area and configured to sense the first beams;
   a display panel having a display surface and a back surface, the sensing area being defined on the display surface; and
   a light guide plate having a light emission surface, opposite to the back surface, and a plurality of side surfaces, connected to the light emission surface, the light source assembly being configured to be opposite to one of the side surfaces, wherein the light guide plate is covered with the sensing area;
   wherein the first point light sources are configured to sequentially emit the first beams into the light guide plate and laterally emit the first beam into the light guide plate, the first beams are parallel to each other, the first beam emitted by the light guide plate is configured to sequentially emit upward to the display surface, and when one of the first beams from one of the first point light sources is blocked by an object to form a partially-bright first beam, the light sensing component is configured to sense the partially-bright first beam to determine a straight line between the object and the light sensing component such that a position of the object is determined by an optical path of the first beam which is blocked by the object and the straight line.

2. The optical touch device according to claim 1, wherein the sensing area is configured to have a rectangular structure with a first side, a second side, a third side and a fourth side, the first and third sides are configured to be opposite to each other, the second and fourth sides are configured to be opposite to each other, the light source assembly is disposed beside the first side, the light sensing component is disposed in a boundary area between the third and fourth sides.

3. The optical touch device according to claim 1, wherein the optical touch device comprises two light source assemblies, the sensing area is configured to have a rectangular structure with a first side, a second side, a third side and a fourth side, the first and third sides are configured to be opposite to each other, the second and fourth sides are configured to be opposite to each other, the light source assembly is disposed beside the first and second sides, the light sensing component is disposed in a boundary area between the third and fourth sides.

4. The optical touch device according to claim 1, wherein the light source assembly further comprises a plurality of second point light sources, each second point light source is configured to provide a second beam, the first beam is an invisible light, and the second beam is a visible light.

5. The optical touch device according to claim 4, wherein the first point light sources include infrared light emitting diodes, the second point light sources include white light emitting diodes.

6. The optical touch device according to claim 4, wherein the first point light sources and the second point light sources are arranged alternatively in a same row.

7. The optical touch device according to claim 4, wherein the first point light sources are arranged in a first row, the second point light sources are arranged in a second row.

8. The optical touch device according to claim 7, wherein the first and second rows are configured to be parallel to each other.

9. The optical touch device according to claim 1, further comprising at least a white light source, the white light source and the light source assembly are disposed to be opposite to two side surfaces of the light guide plate, respectively.

10. The optical touch device according to claim 1, wherein the first point light sources are arranged in a spaced manner.

11. The optical touch device according to claim 1, further comprising a substrate, the sensing area is defined above the substrate.

12. The optical touch device according to claim 1, further comprising a light source control unit electrically connected to the first point light sources and configured to control the first point light sources to emit the first beams sequentially.

13. The optical touch device according to claim 1, wherein the first beam is an invisible light.

14. The optical touch device according to claim 1, wherein the light source assembly further comprises a carrier board, the first point light sources are disposed on the carrier board.

15. An optical touch device, comprising:
    a sensing area;
    at least a light source assembly disposed beside the sensing area and comprising a plurality of first point light sources for emitting a plurality of first beams;
    a light sensing component having a field of view of the entire sensing area and configured to sense the first beams;
    a display panel having a display surface and a back surface, the sensing area being defined on the display surface; and
    a light guide plate having a light emission surface, opposite to the back surface, and a plurality of side surfaces, connected to the light emission surface, the light source assembly being configured to be opposite to one of the side surfaces, wherein the light guide plate is covered with the sensing area;
    wherein the first point light sources are configured to sequentially emit the first beams into the light guide plate and laterally emit the first beam into the light guide plate, the first beams are parallel to each other, the first beam emitted by the light guide plate is configured to sequentially emit upward to the display surface, and when one of the first beams from one of the first point light sources is blocked by an object to form a partially-bright first beam, the light sensing component is configured to sense the partially-bright first beam to determine a straight line between the object and the light sensing component such that a position of the object is determined by an optical path of the first beam which is blocked by the object and the straight line;

wherein the light source assembly further comprises a plurality of second point light sources for providing a second beam such that the second beam illuminates the display surface.

* * * * *